(12) United States Patent
Kendrick et al.

(10) Patent No.: US 9,550,347 B2
(45) Date of Patent: Jan. 24, 2017

(54) METHOD OF CONFIGURING COMPOSITE CORE IN A CORE STIFFENED STRUCTURE AND A STRUCTURE INCORPORATING THE SAME

(71) Applicant: Bell Helicopter Textron Inc., Fort Worth, TX (US)

(72) Inventors: Phillip A. Kendrick, Fort Worth, TX (US); Paul K. Oldroyd, Azle, TX (US); David G. Carlson, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 69 days.

(21) Appl. No.: 13/955,105

(22) Filed: Jul. 31, 2013

(65) Prior Publication Data
US 2015/0037533 A1 Feb. 5, 2015

(51) Int. Cl.
*B32B 37/00* (2006.01)
*B32B 37/14* (2006.01)
(Continued)

(52) U.S. Cl.
CPC ........... *B32B 37/146* (2013.01); *B29C 65/483* (2013.01); *B29C 65/7838* (2013.01); *B29C 66/0042* (2013.01); *B29C 66/1142* (2013.01); *B29C 66/54* (2013.01); *B29C 66/7254* (2013.01); *B29C 66/8185* (2013.01); *B29C 66/83415* (2013.01); *B29D 99/0021* (2013.01); *B32B 3/04* (2013.01); *B32B 3/12* (2013.01); *B32B 5/12* (2013.01); *B32B 5/142* (2013.01); *B32B 7/12* (2013.01); *B64C 1/18* (2013.01); *B64C 3/20* (2013.01); *B29C 65/486* (2013.01);

*B29C 65/4835* (2013.01); *B29C 65/5042* (2013.01); *B29C 65/5057* (2013.01);
(Continued)

(58) Field of Classification Search
CPC .... B32B 3/12; B32B 37/146; B32B 2305/024; B29C 66/7254; B29D 99/0089; B29D 99/0021; B64C 1/18; B64C 3/20; Y10T 156/1089; Y10T 156/1092; Y10T 156/1093; E04C 2/365
USPC ......................................... 156/297, 299, 300
See application file for complete search history.

(56) References Cited

U.S. PATENT DOCUMENTS 2,477,852 A * 8/1949 Bacon ........................... 428/116
2,744,042 A * 5/1956 Pace ............................ 264/46.5
(Continued)

FOREIGN PATENT DOCUMENTS

| EP | 0798107 A2 | 1/1997 |
|---|---|---|
| JP | 2001329651 A * | 11/2001 |
| WO | 2012090518 A1 | 7/2012 |

OTHER PUBLICATIONS

Machine translation of JP 2001-329651 date unknown.*
(Continued)

*Primary Examiner* — John Goff
(74) *Attorney, Agent, or Firm* — Noah A. Tevis

(57) ABSTRACT

A method of manufacturing a core stiffened structure includes orienting the plurality of core wafers in a non-uniform pattern onto a first face sheet, the non-uniform pattern producing non-uniform spacing between adjacent core wafers; assembling a second face sheet onto the plurality of wafers; and curing an adhesive to create a bond between the plurality of wafers, the first face sheet, and the second face sheet.

5 Claims, 18 Drawing Sheets

(51) Int. Cl.
    *B32B 3/12*         (2006.01)
    *B64C 1/18*         (2006.01)
    *B64C 3/20*         (2006.01)
    *B32B 5/14*         (2006.01)
    *B29D 99/00*       (2010.01)
    *B29C 65/48*       (2006.01)
    *B29C 65/78*       (2006.01)
    *B32B 5/12*         (2006.01)
    *B32B 7/12*         (2006.01)
    *B32B 3/04*         (2006.01)
    *B32B 38/00*       (2006.01)
    *B29L 31/30*       (2006.01)
    *B29L 31/60*       (2006.01)
    *B29C 65/00*       (2006.01)
    *B29C 65/50*       (2006.01)

(52) U.S. Cl.
    CPC ....... *B29C 66/1122* (2013.01); *B29C 66/5227* (2013.01); *B29C 66/612* (2013.01); *B29C 66/71* (2013.01); *B29C 66/7212* (2013.01); *B29C 66/72141* (2013.01); *B29C 66/72143* (2013.01); *B29C 66/7392* (2013.01); *B29C 66/7394* (2013.01); *B29C 66/8122* (2013.01); *B29C 66/81261* (2013.01); *B29C 66/81467* (2013.01); *B29C 66/8284* (2013.01); *B29L 2031/3076* (2013.01); *B29L 2031/3088* (2013.01); *B29L 2031/608* (2013.01); *B32B 2038/0076* (2013.01); *B32B 2260/023* (2013.01); *B32B 2260/046* (2013.01); *B32B 2307/302* (2013.01); *B32B 2605/00* (2013.01); *B32B 2605/18* (2013.01); *Y10T 156/1093* (2015.01); *Y10T 428/24149* (2015.01); *Y10T 428/24165* (2015.01)

(56) References Cited

U.S. PATENT DOCUMENTS

| | | | |
|---|---|---|---|
| 3,664,906 A * | 5/1972 | Hartig | 428/116 |
| 4,336,090 A | 6/1982 | Hilton | |
| 4,453,367 A * | 6/1984 | Geyer et al. | 52/793.1 |
| 6,698,484 B1 * | 3/2004 | Corbett et al. | 156/382 |
| 2009/0162548 A1 * | 6/2009 | Kaspersion | 427/243 |
| 2011/0151183 A1 * | 6/2011 | Reller et al. | 428/134 |

OTHER PUBLICATIONS

European Communication in related European Application No. 13195029.7, dated May 15, 2014, 4 pages.
European Search Report in related European Application No. 13195029.7, dated Apr. 14, 2014, 3 pages.
European Communication in related European Application No. 13195029.7, dated Apr. 7, 2015, 3 pages.
Notice of Allowance in related European Application No. 13195029.7, dated Nov. 19, 2015, 53 pages.

* cited by examiner

US 9,550,347 B2

METHOD OF CONFIGURING COMPOSITE CORE IN A CORE STIFFENED STRUCTURE AND A STRUCTURE INCORPORATING THE SAME

BACKGROUND

Technical Field

The present disclosure relates to a method of configuring composite core in a core stiffened structure, as well as a core stiffened structure with composite core configured using such a method.

Description of Related Art

Typically, composite core is built in bulk shapes that must be cut into usable slices. The usable slices are adjacently joined together in a bonding process, such as by bonding cell walls of adjacent composite core slices together. Such a method is labor intensive and can substantially increase the expense of the core stiffened structure.

Hence, there is a need for an improved method of manufacturing a core stiffened structure.

In another typical method of manufacturing a core-stiffened structure, the core is homogeneously placed within the core stiffened structure, thus some areas of the structure may be stronger than necessary since the homogenous composite core is configured for the area of the structure that requires the most strength.

Hence, there is a need for efficiently tailoring the properties of a composite core stiffened structure by tailoring the composite core in the core stiffened structure.

DESCRIPTION OF THE DRAWINGS

The novel features believed characteristic of the method and apparatus of the present disclosure are set forth in the appended claims. However, the method and apparatus itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the method and apparatus of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
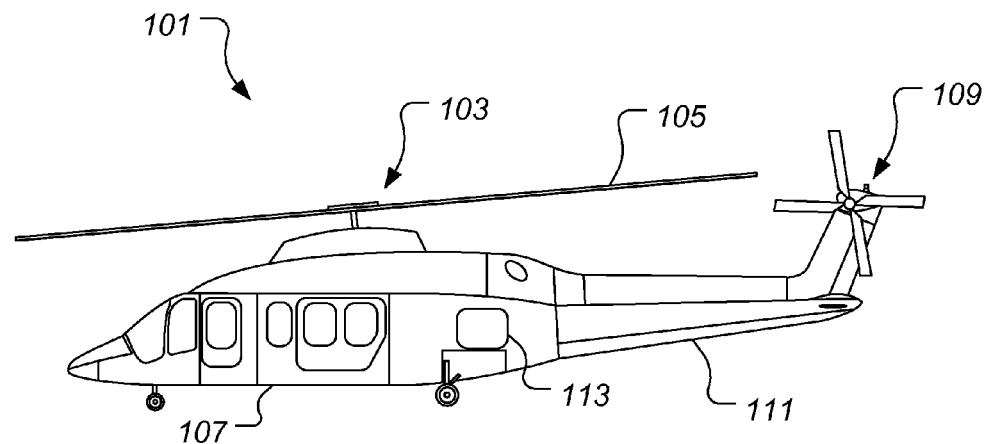
FIG. 1 is a side view of an rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 can further include a fuselage 107, anti-torque system 109, and an empennage 111.

Rotorcraft 101 is merely illustrative of the wide variety of aircraft, vehicles, and other objects that are particularly well suited to take advantage of the method and system of the present disclosure. It should be appreciated that other aircraft can also utilize the method and system of the present disclosure. Further, other vehicles and objects can utilize composite core manufactured by the system and method of the present disclosure. Illustrative embodiments can include wind turbine blades, sea based vehicles, radomes, enclosures, shelters, bridge decks, building facades, ground vehicles, rail vehicles, air vehicles, space vehicles, and manned or un-manned vehicles, to name a few.

Figure 2:
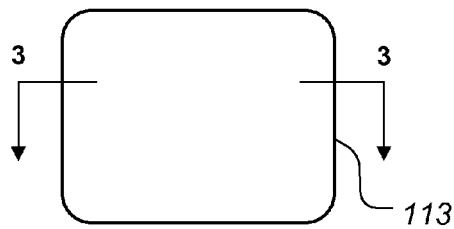
FIG. 2 is a side view of a panel, according to one example embodiment.
Figure 3:
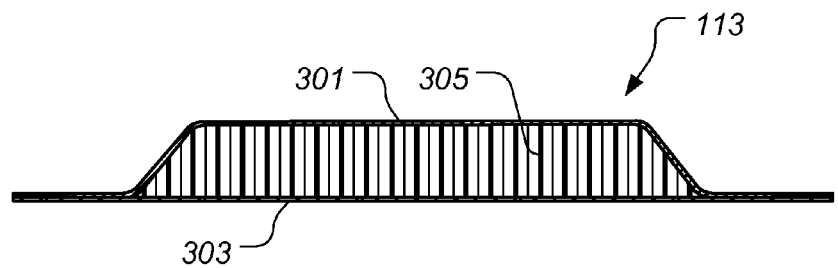
FIG. 3 is a cross-sectional view of the panel, taken from section lines 3-3 in FIG. 2, according to one example embodiment.

Referring now also to FIGS. 2 and 3, a panel 113 on rotorcraft 101 is illustrative of a wide variety of structures that can include a core member configured as a lightweight means of generating strength and stiffness in the structure. Panel 113 is a composite assembly that can include an upper skin 301, a lower skin 303, and a composite core 305. Composite core 305 can be adhesively bonded to upper skin 301 and lower skin 303. It should be appreciated that panel 113 can take on a wide variety of contours and configurations.

Figure 4:
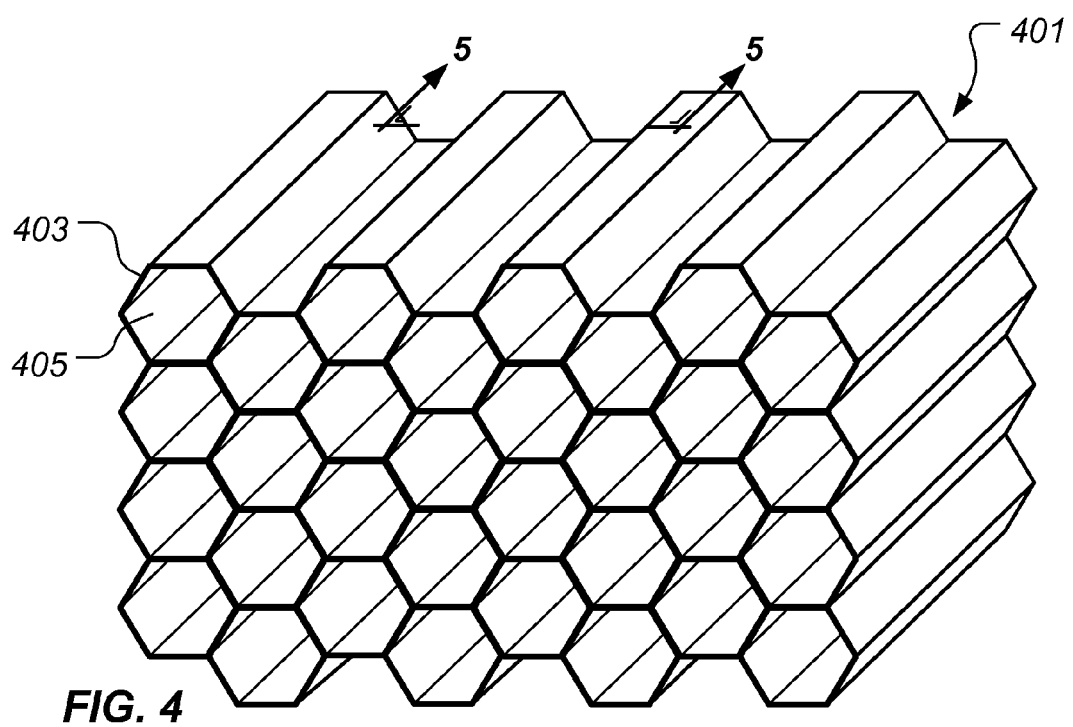
FIG. 4 is a perspective view of a composite core, according to one example embodiment.
Figure 5:
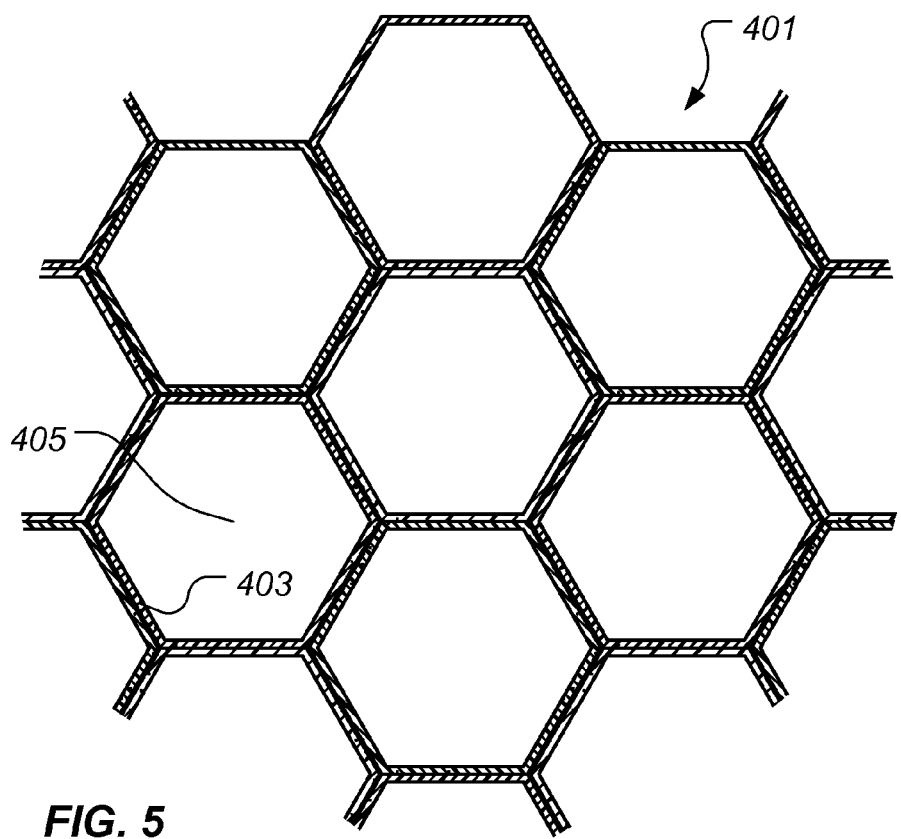
FIG. 5 is a cross-sectional view of the composite core, taken from section lines 5-5 in FIG. 4, according to one example embodiment.

Referring now also to FIGS. 4 and 5, composite core 401 is illustrated in a raw stock configuration. Composite core 305 (shown in FIG. 3), having implementation specific geometry, can be carved from composite core 401, for example. In another embodiment, composite core 401 is manufactured in a net shape such that a subsequent carving procedure is not required. Composite core 401 can be of a wide variety of materials and cell sizes. For example, in one embodiment composite core 401 is made from a carbon fiber and resin composite system. Composite core 401 includes a plurality of tubes 403 (only one tube labeled for clarity) arranged in a two-dimensional array. However, in one embodiment the tubes 403 can be selectively positioned such that the end portions are not in the same plane. Each tube 403 defines a passageway or "cell" 405 extending therethrough. Composite core 401 can comprise any suitable number, size, cross-sectional shape, and construction of tubes 403.

Each tube 403 of composite core 401 can include a plurality of reinforcement fibers disposed in a polymeric matrix. For example, tubes 403 may comprise fibers comprising one or more of carbon, graphite, glass, an aromatic polyamide (i.e., "aramid") material, a variant of an aromatic polyamide material (e.g., a polyparaphenylene terephthalamide material, such as Kevlar® by E. I. du Pont de Nemours and Company of Richmond, Va.), or the like. The scope of the present disclosure, however, encompasses fibers comprising any suitable material or combination of materials. The polymeric matrix may comprise any suitable resin system, such as a thermoplastic or thermosetting resin for example. Exemplary resins include epoxy, polyimide, polyamide, bismaleimide, polyester, vinyl ester, phenolic, polyetheretherketone (PEEK), polyetherketone (PEK), polyphenylene sulfide (PPS), and the like.

The fibers of tubes 403 may be oriented in one or more directions and may be woven or unwoven. It should be appreciated that tube 307 may alternatively only include fibers arranged in a single direction, such as a uniaxial or helical fiber configurations. In yet another embodiment, a first ply comprises fibers and a second ply comprises fibers, such that the second ply is laid-up over the first ply.

Figure 6:
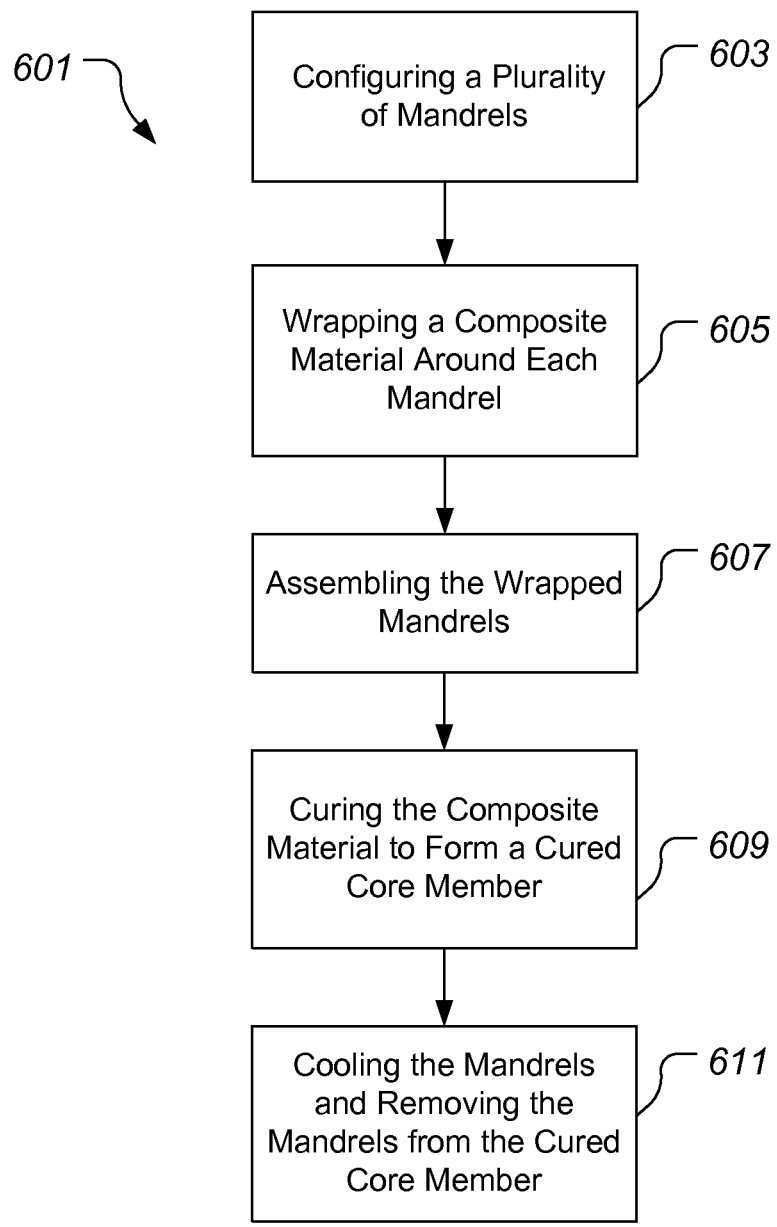
FIG. 6 is a schematic view of a method of manufacturing a composite core, according to one example embodiment.

Referring now also to FIG. 6, a method 601 of manufacturing a composite core, such as composite core 401, is schematically illustrated. Method 601 can include a step 603 of configuring a plurality of mandrels. A step 605 can include wrapping a composite material around each mandrel. A step 607 can include assembling the wrapped mandrels. A step 609 can include curing the composite material to form a cured core member. A step 611 can include cooling the mandrels and removing the mandrels from the cured core member. Each step of method 601 is described in further detail herein.

Figure 21:
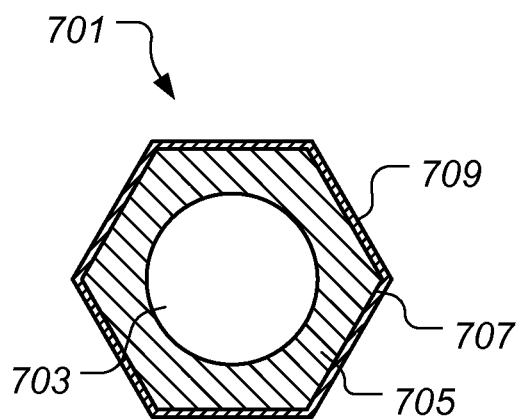
FIG. 21 is a cross-section view of a mandrel taken from FIG. 8, according to one example embodiment.

Referring to FIG. 21, a cross-sectional view through a mandrel 701 is illustrated. Step 603 includes configuring a plurality of mandrels. In the illustrated embodiment, mandrel 701 is a metallic mandrel, such an aluminum material. Mandrel 701 is configured having a material with a relatively low coefficient of thermal expansion (CTE). In the illustrated embodiment, mandrel 701 is preferably cured in a tool that utilizes a bladder or other device to apply pressure from the exterior. However, it should be appreciated that method 701 can also be configured with a material having a desired amount of CTE so that curing pressure is derived from a thermal expansion of the mandrels within a confining tool.

Mandrel 701 may be configured with a hollow portion 703 extending through the centerline length of mandrel 701, forming a body portion 705 between hollow portion 701 and outer surface 707. Mandrel 701 is configured so that during the curing process of the composite core 401, the temperature of each mandrel 701 is increased such that body portion 705 volumetrically expands uniformly both in an inward direction and an outward direction, until outer surface 707 is bounded by its nearest neighbor mandrel, at which point the pressure exerted by mandrel 701 on its nearest neighbor mandrel remains relatively constant, and the thermal expansion of body portion 705 continues primarily in inward direction. The degree of thermal expansion each mandrel 701 is dependent upon the CTE of the material of each mandrel 701. The geometry of mandrel 701 can be selected to tailor the physical properties of mandrel 701 and the resultant composite core 401. Further, the geometry of mandrel 701 can be selected to tailor the strength/stiffness of the mandrel 701. Further, the wall thickness of body portion 705, as well as the geometry of hollow portion 703, can be selectively controlled to produce a desired thermal expansion profile. For example, a mandrel having a smaller hollow portion 703 would provide a higher external pressure than mandrel 701. In the illustrated embodiment, hollow portion 703 is of a cylindrical shape; however, it should be appreciated that other embodiments may have non-cylindrical shapes.

Each mandrel 701 is configured with a hollow portion 703 which allows hot air to be ducted therethrough during the cure cycle, as discussed further herein. However, it should be appreciated that an alternative embodiment of mandrel 701 does not include a hollow portion 703. It should be appreciated that mandrel 701 is merely illustrative of a wide variety of mandrel configurations contemplated. Even though the exterior shape of the mandrels are illustrated as hexagonal, the present disclosure includes mandrels having other exterior shapes, such as square, rectangular, triangular, to name a few examples. Further, it should be appreciated that the hollow portion within the mandrels can be any variety of shape, or shapes. The exact shape of the hollow portion is implementation specific.

In one example embodiment, a Teflon® material, or other bond resistant material or coating, can be used to prevent the composite material from bonding to the exterior surface of mandrel 701 during the cure cycle. As such, each mandrel 701 can include a layer 709 of the bond resistant material adjacent to the outer surface 707 of each mandrel 701.

Referring again to FIG. 6, step 605 includes wrapping composite material around each mandrel, such as mandrel 701. The exact method of wrapping or otherwise depositing the uncured composite material on the exterior surface of each mandrel is implementation specific. In the preferred embodiment, one or more steps of method 601 are performed by an automated system; however, it should be appreciated that any of the steps can be performed manually.

Figure 7:
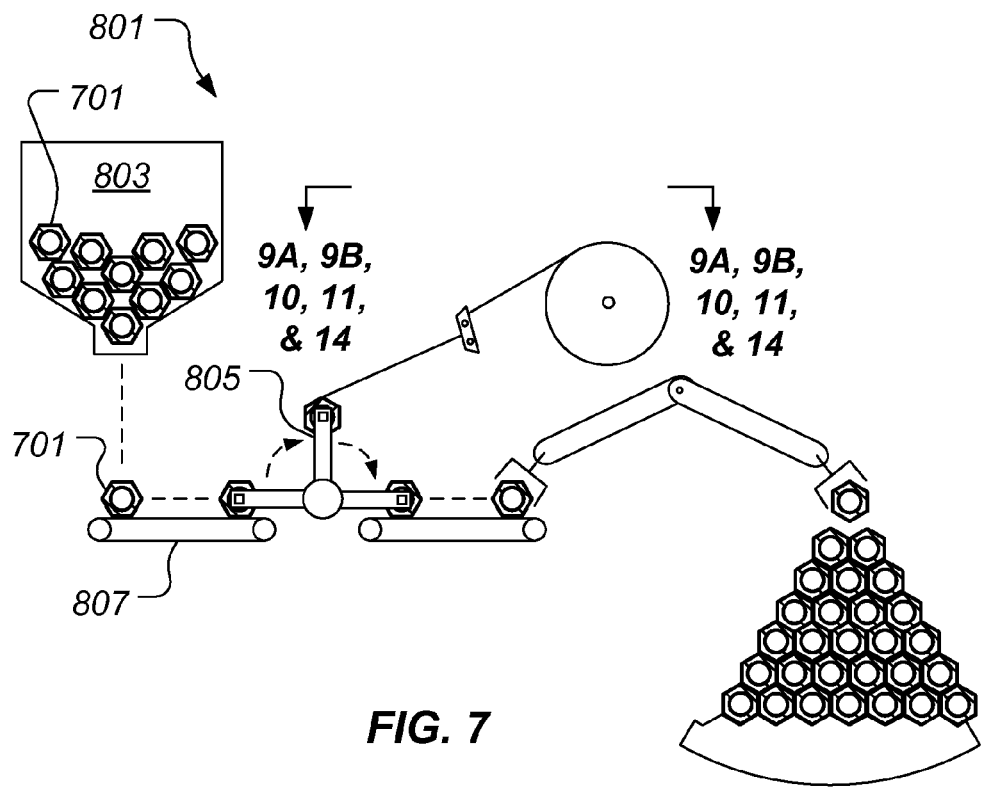
FIG. 7 is a partially stylized view of a system for wrapping and assembling mandrels, according to example embodiment.

Referring also to FIG. 7, a system 801 for at least partially performing one or more steps of method 601 is illustrated. Further, system 801 is particularly well suited for performed steps 605 and 607. Step 605 includes wrapping composite material around each mandrel. Step 607 includes assembling the wrapped mandrels. Each of steps 605 and 607, as well as system 801, are further described herein.

System 801 can include a hopper 803 configured to house a plurality of mandrels 701. Each mandrel 701 can be selectively deployed and captured by a winding jig 805. For example, each mandrel 701 can be released onto a conveyor 807 and picked up by the arms of winding jig 805.

Figure 8:
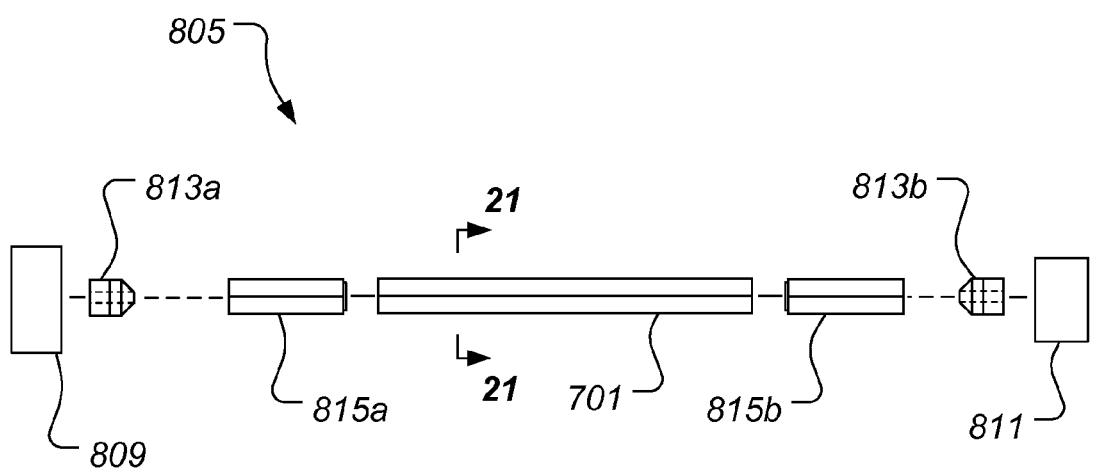
FIG. 8 is an exploded view of a mandrel winding jig, according to example embodiment.

Referring also to FIG. 8, an embodiment of winding jig 805 is illustrated. Winding jig 805 is configured to position and retain mandrel 701 for the depositing of composite material thereon. It should be appreciated that winding jig 805 can take on a variety of implementation specific configurations. In one embodiment, winding jig 805 can include a driver 809 and a support member 811. Adapters 813a and 813b are operably associated with driver 809 and support member 811, respectively. A coupling 815a is positioned between driver 809 and a first end portion of mandrel 701. Similarly, a coupling 815b is positioned between support member 811 and a second end portion of mandrel 701.

Winding jig 805 is configured to operably secure mandrel 701 between couplings 815a and 815b. Couplings 815a and 815b have similar geometry to that of mandrel 701. Further, winding jig 805 is configured such that the geometry of couplings 815a and 815b are aligned with mandrel 701 during the composite material winding process. In the illustrated embodiment, driver 809 is configured to drive the rotation of adapters 813a and 813b, couplings 815a and 815b, and mandrel, while support member 811 is configured to provide freewheeling support. In an alternative embodiment, mandrel 701 and couplings 815a and 815b are held stationary while a device operates to place the composite material about the mandrel and couplings 815a and 815b, as discussed further herein. It should be appreciated that winding jig 805 is merely illustrative of a fixture that can be used to facilitate the depositing of composite material onto mandrel 701 in step 605 of method 601.

Figure 9A:
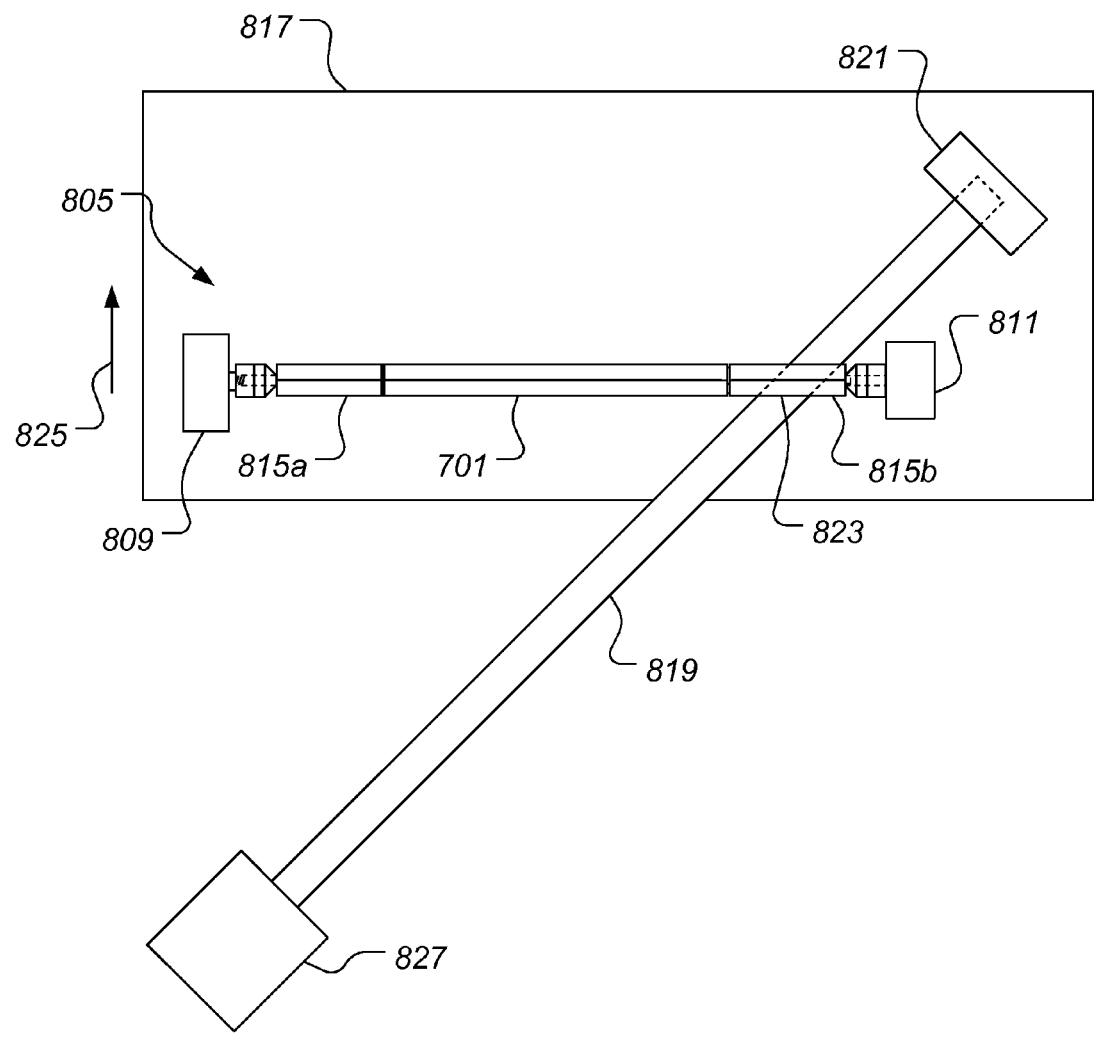
FIG. 9A is a top view of a winding jig, according to example embodiment.

Referring also to FIG. 9A, one non-limiting example embodiment of winding jig 805 for performing at least step 605 of method 601 is illustrated. Winding jig 805 is mounted to a platform 817 that can be translated along a prescribed path. A first end portion of slit 819 can be secured to a mount 821 that is secured to platform 817. Slit 819 is positioned through an opening 823 in coupling 815b. A second end portion of slit 819 can remain part of a roll 827 of composite material. In one embodiment, a plurality of cutting members cut roll 827 of composite material into a plurality of slits 819 at prescribed widths, each slit 819 being fed to different winding jigs 805. Platform 817 is biased in direction 825 by a constant tension member such that slit 819 is held in tension. Mount 821 and roll 817 are positioned so that slit 819 is oriented at a desired angle relative to mandrel 701. In the illustrated embodiment, the desired angle of slit 819 is 45 degrees; however, slit 819 can be oriented at any desired angle.

Figure 9B:
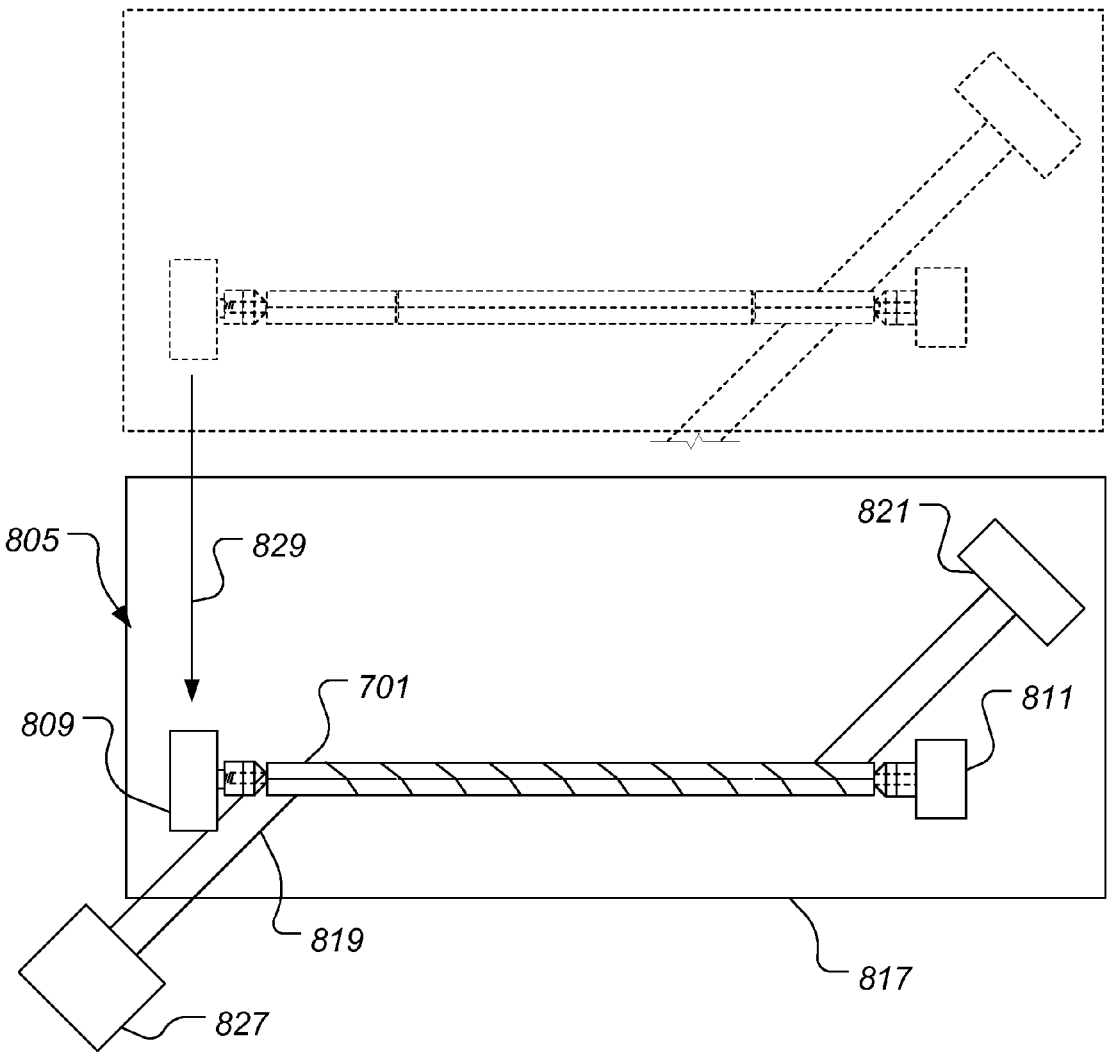
FIG. 9B is a top view of a winding jig, according to example embodiment.

Referring also to FIG. 9B, the operation of winding jig 805 is illustrated. Driver 809 is operated so as to cause mandrel 701 to rotate, which causes slit 819 to wrap around mandrel 701. As slit 819 wraps around mandrel 701, platform 817 is pulled toward roll 817 in direction 829 while the wrap angle is maintained.

Figure 10:
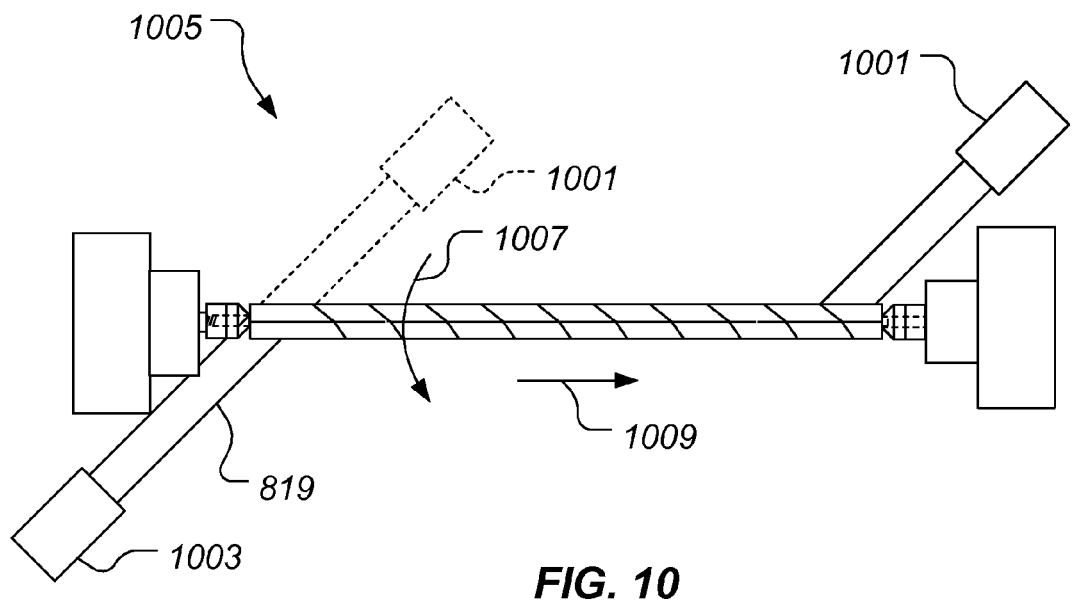
FIG. 10 is a top view of a winding jig, according to example embodiment.

Referring also to FIG. 10, another example embodiment of a winding jig 1005 for wrapping composite material on each mandrel 701 in step 605 is illustrated. Winding jig 1005 is substantially similar to winding jig 805; however, winding jig 1005 is configured so that mandrel 701 is held stationary while a material placement head 1001 moves around mandrel 701, as well as translates along an axis of mandrel 701, such as in directions 1007 and 1009, respectively. Material placement head 1001 is configured to feed composite material while moving in a prescribed path. In such an embodiment, slit 819 can be secured at a stationary mount 1003 so that slit 819 can be placed in tension by material placement head 1001 as slit 819 is wrapped around mandrel 701.

Figure 11:
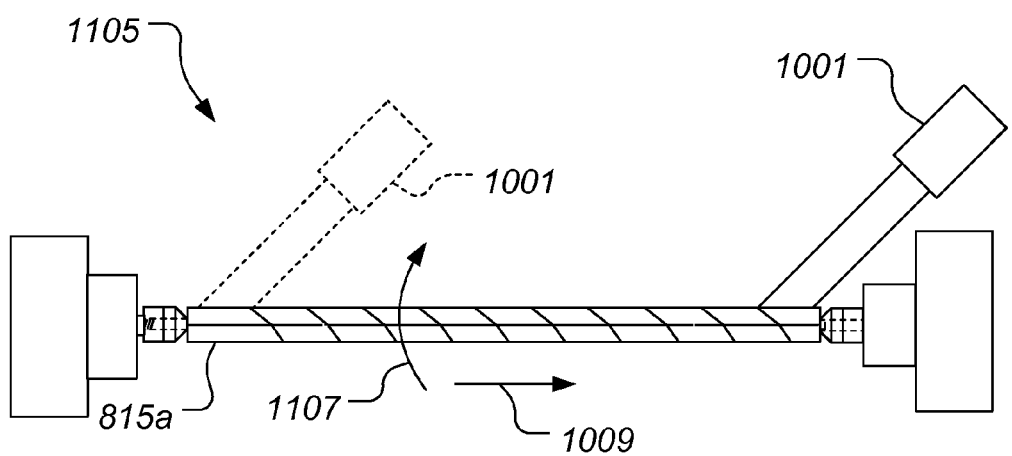
FIG. 11 is a top view of a winding jig, according to example embodiment.

Referring also to FIG. 11, another example embodiment of a winding jig 1105 for wrapping composite material on each mandrel 701 in step 605 is illustrated. Winding jig 1105 is substantially similar to winding jig 1005; however, winding jig 1105 is configured so that mandrel 701 is rotated in a direction 1107 while material placement head 1001 translates along an axis of mandrel 701 corresponding with direction 1009. In such an embodiment, slit 819 can be secured to coupling 815a, for example, so that tension can be formed in slit 819 as material placement head 1001 translates and mandrel 701 rotates.

In another example embodiment, the winding jig is configured to translate along a direction corresponding with the axis of mandrel 701 while material placement head 1001 rotates but does not translate.

It should be appreciated that the winding jig can be configured in any combination of the configurations described herein. For example, mandrel 701 can rotate in a first rotational direction while material placement head 1001 rotates around mandrel 701 in an opposite direction to that of the first rotational direction. Further, either mandrel 701 can translate along its axis or the material placement head can translate in a direction corresponding to the mandrel axis, or any combination thereof.

It should be appreciated that the exact system and method for depositing raw composite material on mandrel 701 can be dependent at least upon the material form of the raw composite material.

Figure 12:
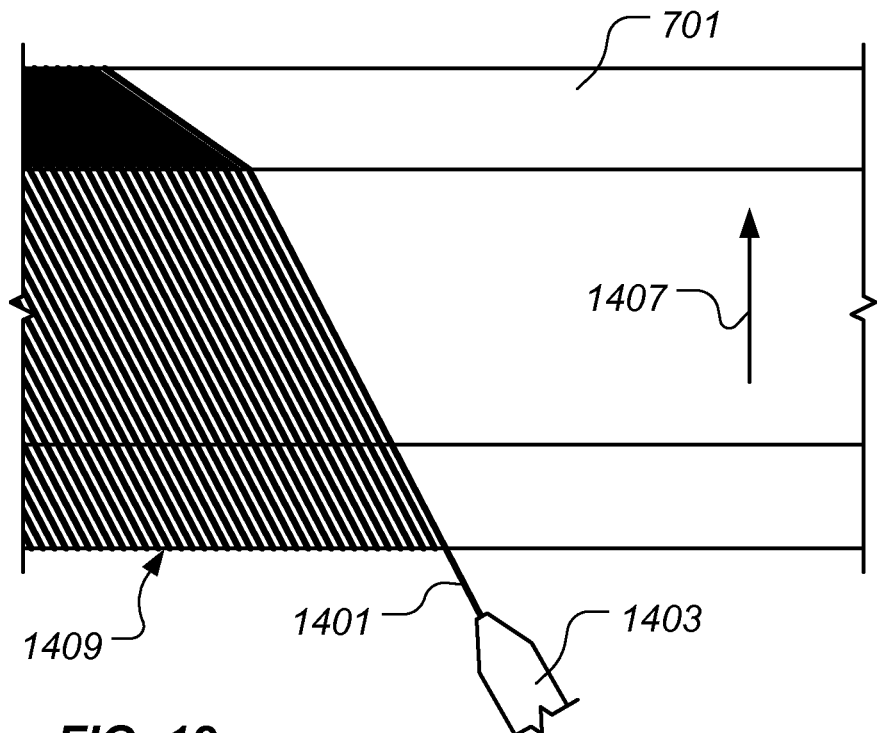
FIG. 12 is a stylized, plan view of a mandrel being wrapped with uncured composite material, according to one particular embodiment.

Referring also to FIG. 12, one technique of wrapping uncured composite material around mandrel 701 utilizes a filament winding process. A continuous, resin-impregnated fiber 1401, extending from a filament winding machine 1403, is wound about mandrel 701. The resin can be either a thermosetting or thermoplastic resin and becomes the polymeric matrix of tube 403 upon curing. The material placement process may be conducted in a variety of processes; for example, mandrel 701 can move axially while a spool of fiber 1401 rotates around the mandrel 701, as indicated by an arrow 1407. Alternatively, a spool or a plurality of spools of material could rotate around mandrel 701. Relative motion of the material dispensing mechanism to mandrel 701 is inferred. As fiber 1401 is wound onto mandrel 701 by filament winding machine 1403, a helical shaped pattern is formed. One or more plies 1409 of fiber 1401, in desired orientations with respect to mandrel 701, are wound onto mandrel 701 to form the basic geometry of tube 403. The angle of which fiber 1401 is wound about mandrel 701 may vary along the length of the mandrel 701 in order to customize the strength of core 401. For example, the angle of the fiber 1401 may be dynamically changed during the material placement process in order to customize a compressive strength of the core. Note that, in the illustrated embodiment, mandrel 701 exhibits a size and shape corresponding to cell 405 (see FIG. 4 or 5). It should be further noted; however, that the present disclosure is not limited to the particular illustrated configurations of filament winding machine 1403 or mandrel 701. Mandrel 701 and the one or more plies 1409 that have been filament wound onto mandrel 701 are subsequently assembled with other mandrels and plies, as will be discussed in greater detail herein, to form core 401 (shown in FIG. 4). It should further be appreciated that upon cutting of plies 1409 and the mandrel 701, the material may have a tendency to un-wind. A band of material, potentially adhesive or fibrous, may be used to keep fiber 1401 from unraveling upon cutting of the plies 1409 and the mandrel 701. An adhesive material with unidirectional fibers could be used to band the fiber 1401 on mandrel 701. Further, the band can be selectively located and used to provide extra support for a subsequent post processing procedure of the core, such as a machining process.

Figure 13:
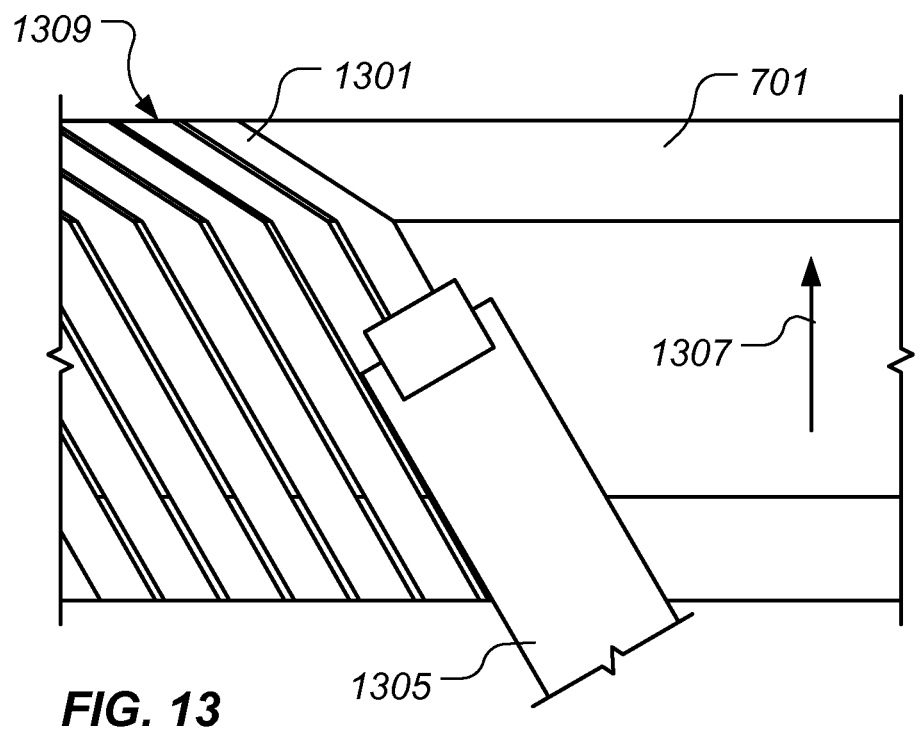
FIG. 13 is a stylized, plan view of a mandrel being wrapped with uncured composite material, according to one particular embodiment.

In yet another example technique of performing step 605 of method 601, shown in FIG. 13, wrapping uncured composite material around mandrel 701 is performed using a fiber placement process. A continuous, resin-impregnated tow 1301 (only one labeled for clarity) of approximately, but not limited to, 1000 fibers is applied to a mandrel 701 by a fiber placement machine 1305. It should be appreciated that tow 1301 may also be portions of a full tow; for example, tow 1301 may be a half tow of 500 fibers. In lieu of a tow 1301, a tape of fibers, cut to a prescribed width, may be used. A pre-cut tape of fibers may be referred to as a "slit-tape." A slit-tape allows the user to more closely control the width dimension, as compared to a tow of fibers. Exemplary prescribed widths of slit-tape include ⅛" and ¼", to name a few. The resin can be a thermosetting or thermoplastic resin, to name two examples, and becomes the polymeric matrix of tube 403 upon curing. During the fiber placement process, mandrel 701 can move axially while tow 1301 rotates around the mandrel 701, as indicated by an arrow 1307. As tow 1301 is applied to mandrel 701 by fiber placement machine 1305, a helical shaped pattern is formed. One or more plies 1309 of tow 1301, in desired orientations with respect to mandrel 701, are wound onto mandrel 701. In one embodiment, one or more non-helical plies layers may be assembled on mandrel 701 to customize mechanical properties in certain directions. It should be appreciated that more than one tow 1301 or slit-tape of different materials may be used. Note that, in the illustrated embodiment, mandrel 1303 exhibits a size and shape corresponding to cell 405 (see FIG. 4 or 5). It should be further noted, however, that the present disclosure is not limited to the particular illustrated configurations of fiber placement machine 1305 or mandrel 701. Mandrel 701 and the one or more plies 1309 that have been fiber placed onto mandrel 701 are subsequently assembled with other mandrels and plies, as will be discussed in greater detail below, to form core 401 (shown in FIG. 4).

Figure 14:
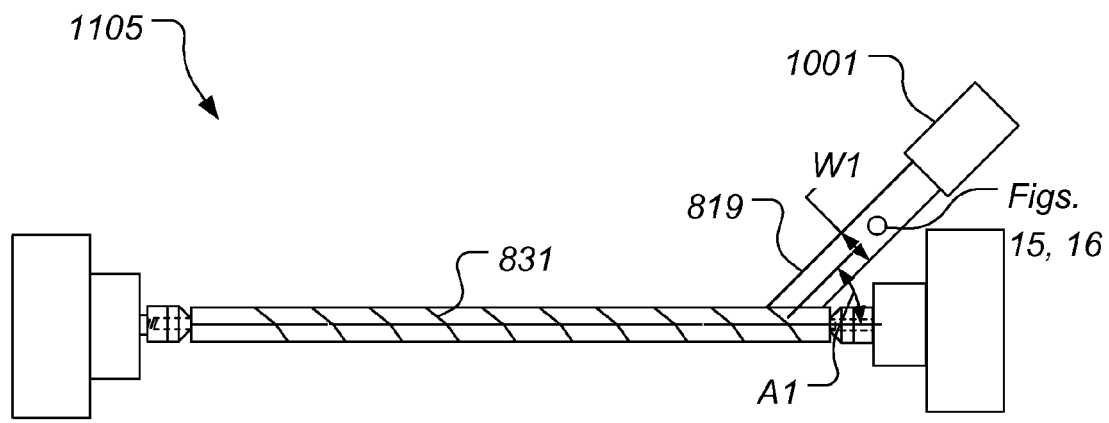
FIG. 14 is a top view of a winding jig, according to example embodiment.
Figure 15:
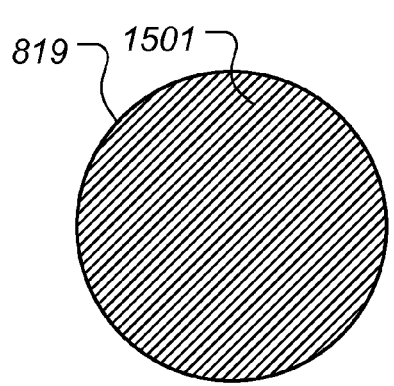
FIG. 15 is a detail view taken from FIG. 14, according to one example embodiment.
Figure 16:
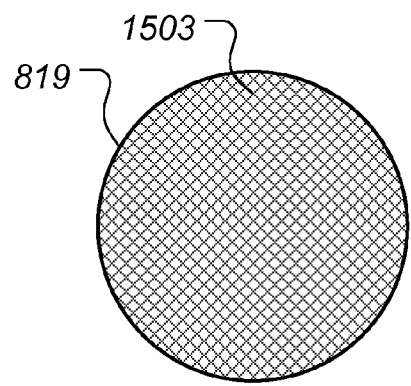
FIG. 16 is a detail view taken from FIG. 14, according to one example embodiment.

Referring now also to FIGS. 14-16, one example embodiment of step 605 includes wrapping mandrel 701 with a broadgood form of slit 819 in such a procedure that results in solid passageway or "closed cell" geometry. Namely, the broadgood form of slit 819 has a width W1 that is selected to prevent a gap or space in the slit 819 after slit 819 is wrapped around mandrel 701. Further, as slit 819 is wrapped around mandrel 701, a continuous seam 831 is formed; however, seam 831 is not a gap or space in the material, rather seam 831 represents an abutment of helically wrapped material, such as slit 819, which is an example of a customized width broadgood composite material. In contrast, the wrapping of a mandrel with composite material that produces a gap or space in the material, or an "open cell" geometry, as described with regard to FIGS. 12 and 13, can have undesirable attributes in certain implementations. For example, the "open cell" embodiment may be limited by the widths of the tows or slits having to be consistent, resulting in having only a fixed whole number of tows for a given spacing and angle, and the gaps having to be a uniform width. The result is only having a fixed whole number of materials for a given spacing and angle. The angle with which the tow or slit is wrapped cannot be varied infinitely and still retain a specific tow or slit width and spacing. Furthermore, an "open cell" geometry core can be undesirable in some panel implementations because of insufficient bond surface at the core/skin interface. Further, for a given mandrel geometry there are a limited number of tow or slit width and gap combinations that will satisfy construction of the core tube for a given wrap angle.

Referring in particular to FIGS. 15 and 16, the orientation fibers 1501 of slit 819 is implementation specific. In the embodiment illustrated in FIG. 15, fibers 1501 are unidirectional such that all the fibers extend in a direction corresponding with the length of the slit 819. In the embodiment illustrated in FIG. 16, fibers 1501 are multidirectional so as to form a fabric configuration.

Figure 17:
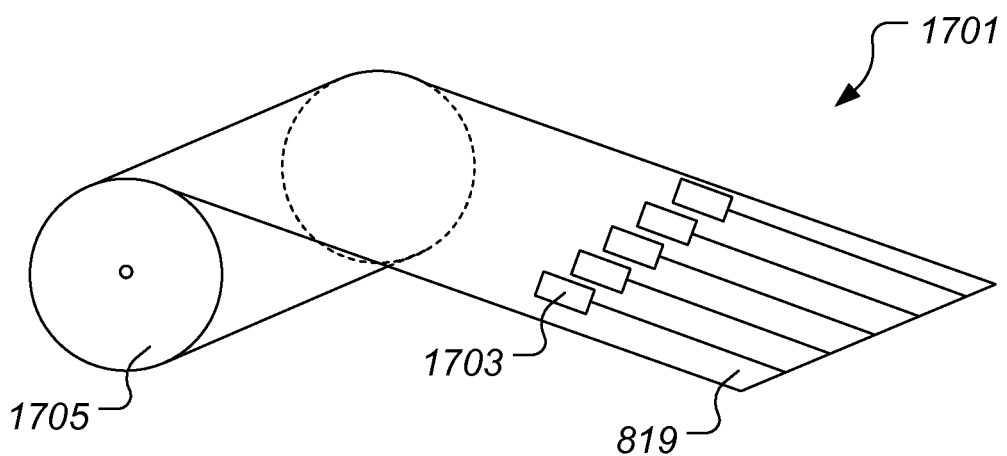
FIG. 17 is a perspective view of a cutting tool, according to one example embodiment.

Still referring to FIGS. 14-16, a nominal width W1 of slit 819 can be calculated by multiplying the circumference of the exterior surface of mandrel 701 by the cosine of the wrap angle A1. One major advantage of using slit 819 to wrap mandrel 701 without material gaps is that the angle A1 can be customized for the core implementation while simply adjusting for the width W1 of slit 819. Furthermore, the slit 819 can be cut off from a much wider roll of bulk raw material, such that the customization of width W1 can be simply a matter of adjusting the cutting tool to provide the implementation specific width. Customizing the angle A1 allows a user to tailor the physical properties of the core by orienting the fibers 1501 in a direction to produce said physical properties. Referring briefly to FIG. 17, an example cutting tool 1701 is illustrated. Cutting tool 1701 can have a plurality of cutting members 1703, such as blades, that can be oriented to cut slits 819 at prescribed widths from a raw material roll 1705. Each slit 819 can be communicated to a winding jig 805, as discussed further herein. Cutting tool 1701 is especially well suited for cutting slits 819 having unidirectional fibers such that cutting members 1703 cut the raw material along between adjacent fibers. In contrast, a cutting tool having a male/female press cutting members may be better suited for cutting slits 819 having multidirectional fibers.

Still referring to FIGS. 14-16, the "closed cell" geometry core produced by wrapping broadgood composite material in step 605 of method 601 enables the use of much thinner and lighter composite material, thereby producing a core with very low density. Further, the "closed cell" geometry core can have significantly higher stiffness and strength than is achievable with "open cell" geometry core. Furthermore, "closed cell" geometry core is fully tailorable.

In another embodiment of step 605 of method 601, mandrel 701 is wrapped multiple times to produce multiple layers of composite material layers. In such an embodiment, the fiber orientation, wrap angle, and/or wrapping direction can be varied to produce tailored mechanical and physical properties.

In some situations it may be desirable to provide ventilation and/or drainage in the composite core, such as in a wing member of an aircraft that also functions as a fuel tank. In such an embodiment, step 605 of method 601 can also include creating perforations in the raw material or slit 819. The perforations can be created by any variety of methods; one method can be running the raw material or slit 819 over a spiked wheel or spiked roller support, for example.

Figure 18:
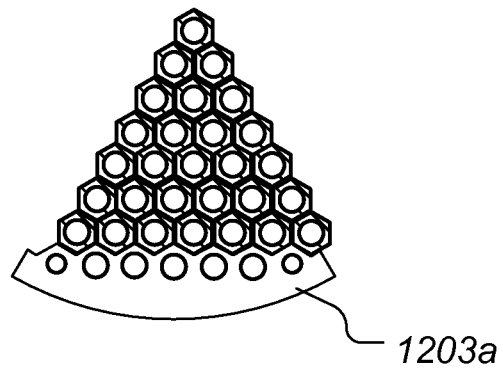
FIG. 18 is a is an end view of a plurality of composite-wrapped mandrels stacked on a partial tool, according to one example embodiment.
Figure 19:
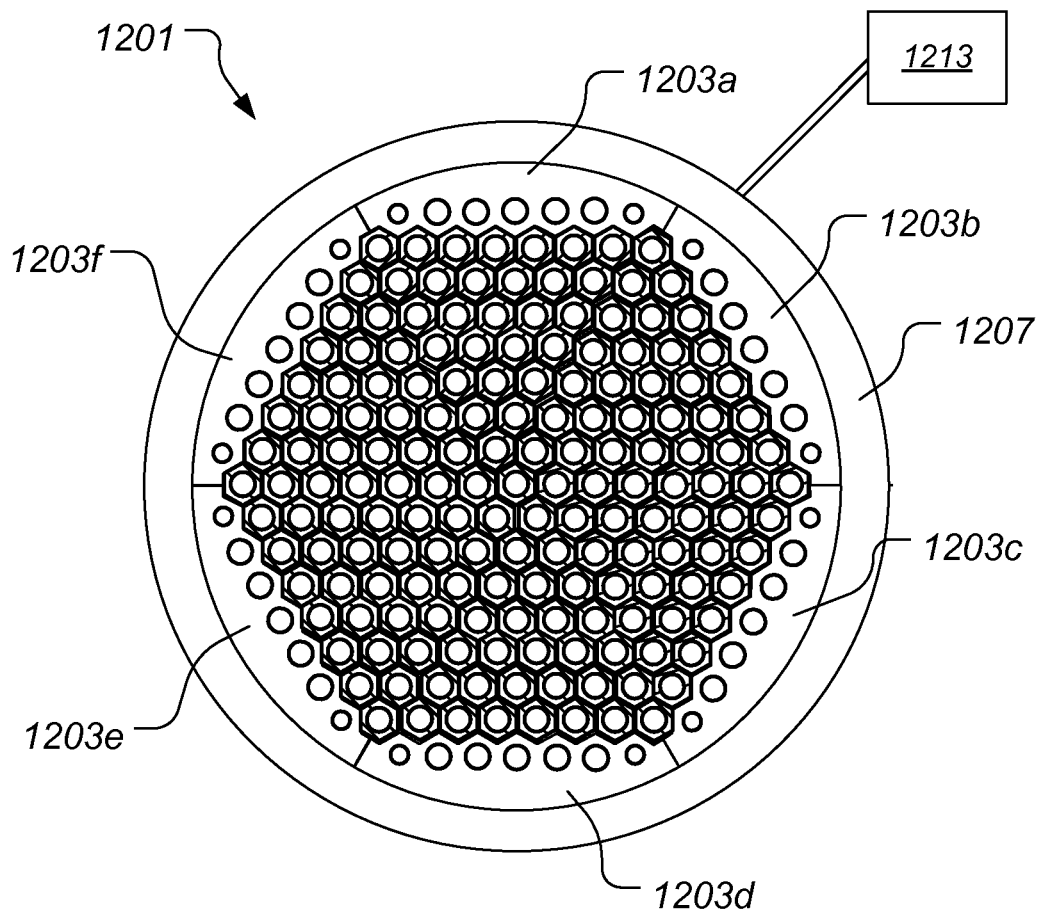
FIG. 19 is an end view of a plurality of composite-wrapped mandrels assembled in a tool, according to one example embodiment.
Figure 20:
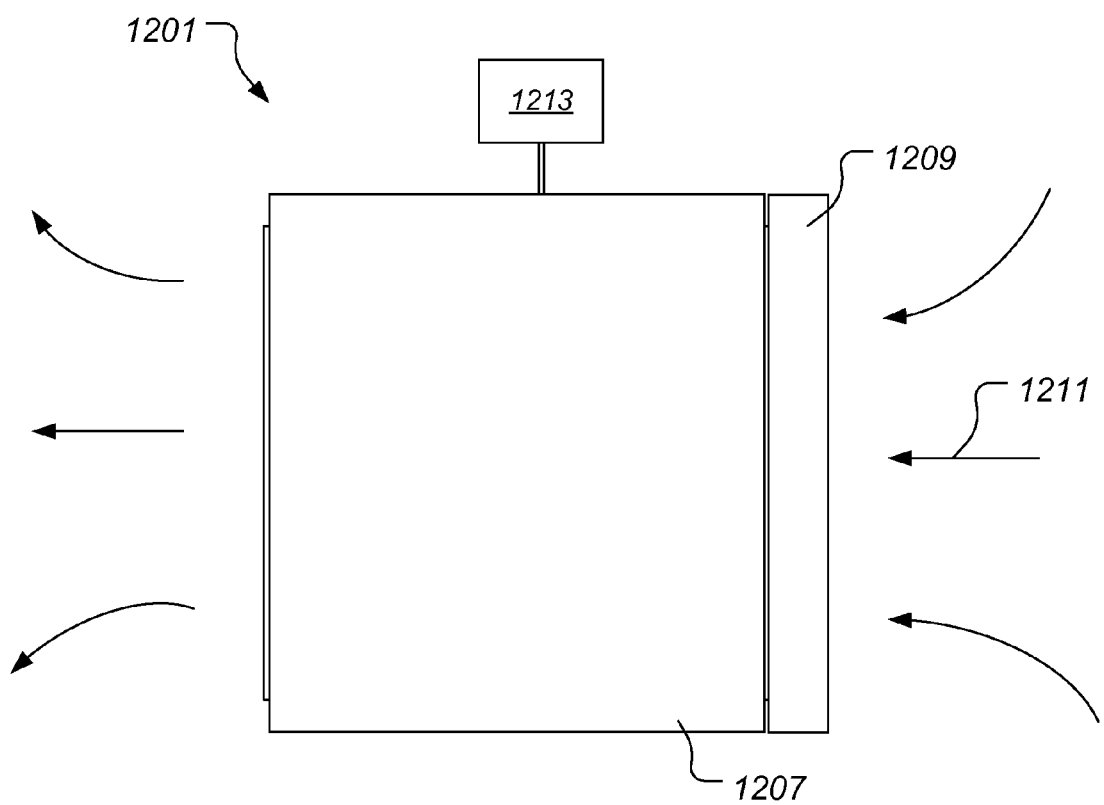
FIG. 20 is a plan view of a plurality of composite-wrapped mandrels assembled in a tool, according to one example embodiment.

Referring again to FIGS. 6 and 7, step 607 of method 601 includes assembling the wrapped mandrels. Step 607 can further include assembling and inserting the wrapped mandrels in a tool or other fixture. The exact configuration of the tool is implementation specific. Referring now also to FIGS. 18-20, an example of a tool 1201 is illustrated. Tool 1201 is configured to produce a hexagonal shaped core member; however, tool 1201 can be configured to provide any desirable shape. For example, alternative shapes of tool 1201 can be configured to produce circular, square, rectangular, or even part customized core shapes. In the illustrated embodiment, the plurality of mandrels 701 having wrapped composite material are assembled onto partial tool members 1203*a*-1203*f* in a pyramid shape. In one embodiment, system 801 is configured to automate the assembly and stacking of wrapped mandrels, as shown in FIG. 7. In another embodiment, the assembly and stacking of wrapped mandrels can be performed manually. Each partial tool member 1203*a*-1203*f* can include apertures 1205 to control and tailor any thermal expansion of the partial tool member 1203*a*-1203*f* during the cure process. In one embodiment, each partial tool member 1203*a*-1203*f* is stacked with seven levels of wrapped mandrels. Upon assembling each partial tool member 1203*a*-1203*f* and their wrapped mandrels, one additional wrapped mandrel 1205 is located in the center. However, it should be appreciated that each partial tool member 1203*a*-1203*f* may be stacked with wrapped mandrels and assembled in a variety of ways.

In one example embodiment, tool 1201 includes a bladder 1207 that is configured to inflate to provide a prescribed inward pressure upon the assembly of wrapped mandrels 701. However, it should be appreciated that the present disclosure contemplates other methods of providing pressure to the composite material wrapped around each mandrel 701 during the curing process, such as mechanical pressure generating devices.

In another embodiment, curing pressure can be generated by the thermal expansion of the mandrels 701. In such an embodiment, tool 1201 can include a rigid constraining structure in lieu of bladder 1207. The heating of the mandrels 701 causes thermal expansion, which generates pressure at the composite material between mandrels 701.

Tool 1201 can include a blower 1209 for generating an airflow 1211 and evenly distributing the airflow through the interiors of the plurality of mandrels 701. In an alternative embodiment, a fluid, such as an oil, is circulated through the interiors of the plurality of mandrels 701. Step 609 can include heating the wrapped mandrels within tool 1201 for a prescribed duration in accordance with the cure requirement of the composite system. An oven can be used to generate that requisite heat, for example. Airflow 1211 can improve the heating rate and heat distribution to the composite material wrapped around each mandrel 701, as such; it is particularly desirable to have an interior opening through each mandrel 701 that is sized to accommodate a prescribed amount of airflow. Bladder 1207 can be controlled by a controller 1213 so as to tailor the amount and timing of pressure exerted at the cell walls of composite material between mandrels 701 within tool 1201.

Referring again to FIG. 6, step 609 of method 601 includes curing the composite material wrapped around the mandrels 701 to form the cured composite core 401. As discussed further above, the uncured composite material around each mandrel 701 is cured by subjecting the assembly to the requisite temperature and pressure. As discussed above, the temperature and rate of temperature change of the composite material can be controlled in part by blowing hot air through the interior of mandrels 701. During the curing process of step 609, the temperature and pressure exerted upon the composite material is implementation specific. Bladder 1207 can be controlled by controller 1213 so as to tailor the amount and timing of pressure exerted at the cell walls of composite material between mandrels 701 within tool 1201. For example, bladder 1207 can be controlled by controller 1213 to change the amount of pressure during a viscosity change of the resin in the composite material.

After the cure cycle is complete, a composite core 401 is achieved as the uncured composite material around each mandrel 701 becomes rigidly bonded to each adjacent tube 403. It should be noted that composite core 401 that is formed by wrapping mandrels 701 with unidirectional fiber slits 819 at a prescribed angle produces composite core 401 that has cross-linked fibers at the cell walls. For example, multiple mandrels 701 wrapped at a wrap angle of +45 degrees with slits 819 having unidirectional fibers will produce cured composite core 401 with cell walls having two plies of fibers at 90 degrees to each other. This unique result of the method and system of the present disclosure produces a very lightweight and strong composite core 401.

Still referring to FIG. 6, step 611 of method 601 includes cooling mandrels 701 and removing mandrels 701 from the composite core 401.

It should be appreciated that method 601, and the process related systems disclosed above are merely illustrative of one exemplary method for manufacturing composite core 401. Furthermore, the post-cure processing methods and systems disclosed herein can be utilized for post-cure processing of composite core 401 made from any suitable manufacturing process.

Figure 22:
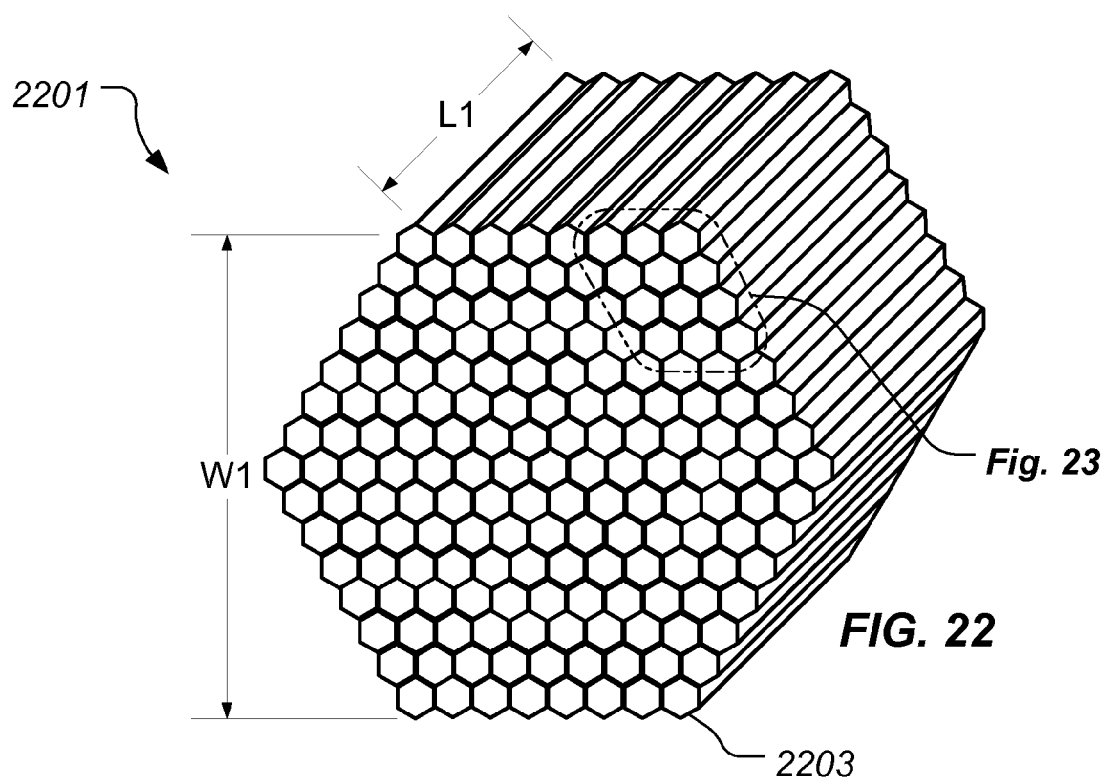
FIG. 22 is a perspective view of a bulk composite core, according to one example embodiment.
Figure 23:
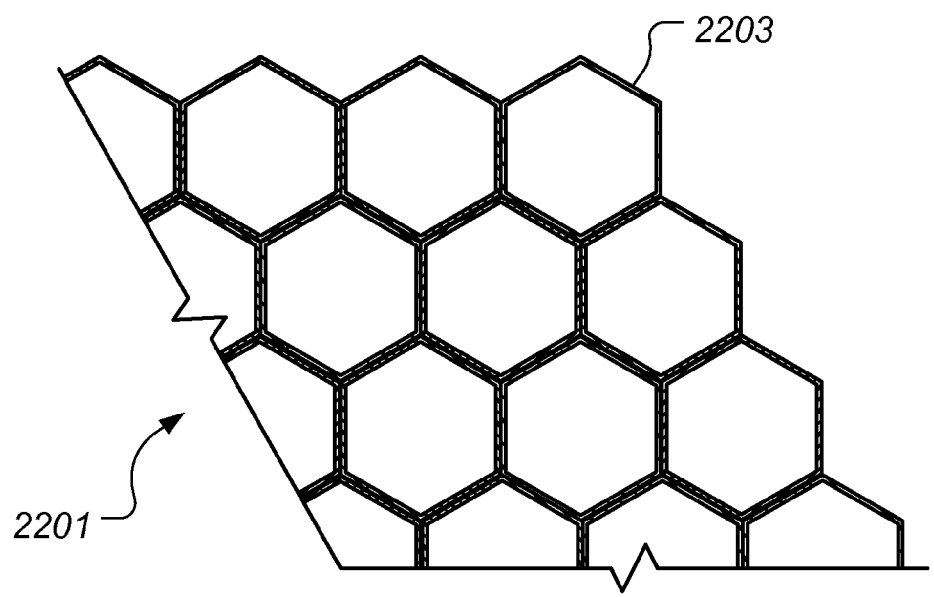
FIG. 23 is a detail view of the bulk composite core taken from FIG. 22, according to one example embodiment.

Referring to FIGS. 22 and 23, a bulk composite core 2201 has an outer hexagonal shape corresponding with a tool having an inner hexagonal shape, such as tool 1201 illustrated in FIG. 19. Further, bulk composite core 2201 is substantially similar to composite core 401, discussed further herein. For example, bulk composite core 2201 has a plurality of tubes 2203 forming a plurality of cells the plurality of cells assembled together such that a perimetrical shape of the bulk composite core is hexagonal with the plurality of cells being oriented with adjacent cell walls in a pattern that results in the perimetrical shape of the bulk composite core being hexagonal in that outwardly exposed cell walls of the plurality of cells create the perimetrical shape. The post-cure processing methods and systems of the present disclosure are discussed herein with regard to bulk composite core 2201; however, it should be appreciated that the post-cure processing methods and systems disclosed herein are applicable to other bulk composite core shapes, as well composite core having other cell member shapes.

The present disclosure includes methods and systems for efficiently and effectively cutting wafers from the bulk composite core 2201. Bulk composite core 2201 is typically produced with an overall size that is larger than required for an implementation; for example, bulk composite core 2201 can have a width W1 of approximate 18 inches and tube lengths L1 of 30 inches. However, it should be appreciated that composite core 2201 can be of any practical size.

Figure 24:
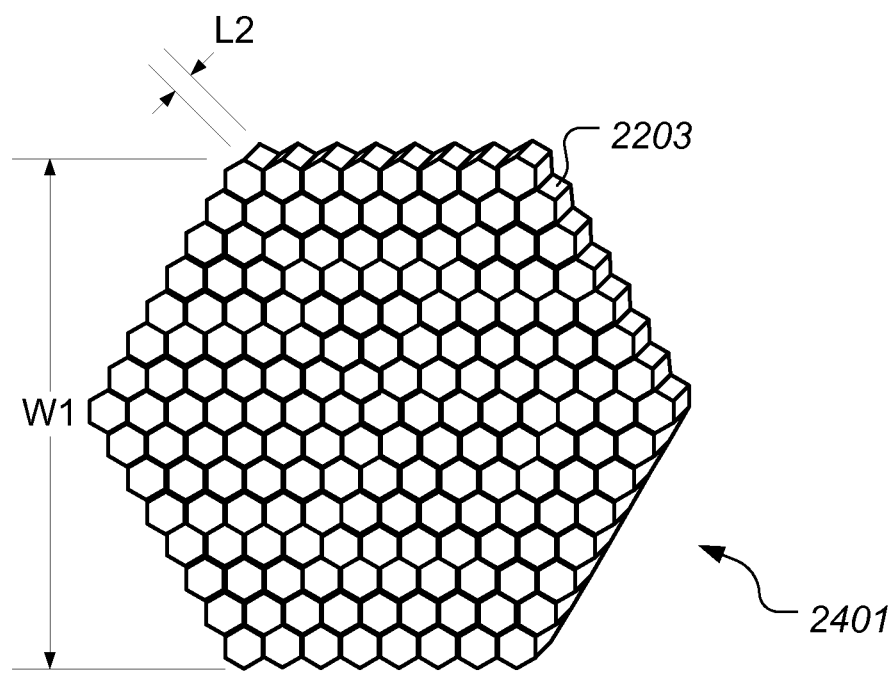
FIG. 24 is a perspective view of a wafer, according to one example embodiment.

Referring now also to FIG. 24, one embodiment of a wafer 2401 is illustrated. Wafer 2401 is a product cut from bulk composite core 2201. In the illustrated embodiment, the tube lengths L2 are approximately ½ inch. However, it should be appreciated that tube lengths L2 can be of any implementation specific size. For example, a wafer 2401 for use in a wing structure may have tube lengths L2 of 8 inches. One object of the present disclosure is to efficiently achieve a high yield of quality wafers 2401 from a bulk composite core 2201.

It should be appreciated that wafers 2401 may be cut from bulk composite core 2201 using any suitable cutting device. For example, exemplary cutting devices may include a band saw, a circular cutting blade, a circular grinding blade, a rope saw, to name a few examples.

Referring again to FIGS. 22 and 23, bulk composite core 2201 has an outer shape of a hexagon that can particularly benefit from the methods and systems disclosed herein. Since the hexagonal bulk composite core 2201 has a non-uniform cross-section, cutting induced forces (such as compression along W1) can cause distortion that may adversely affect the quality of a wafer 2401 cut therefrom. Not only may bulk composite core 2201 have a tendency to compress during the cutting operation, but bulk composite core 2201 may also have a tendency to torsionally twist when subjected to cutting forces.

Figure 25:
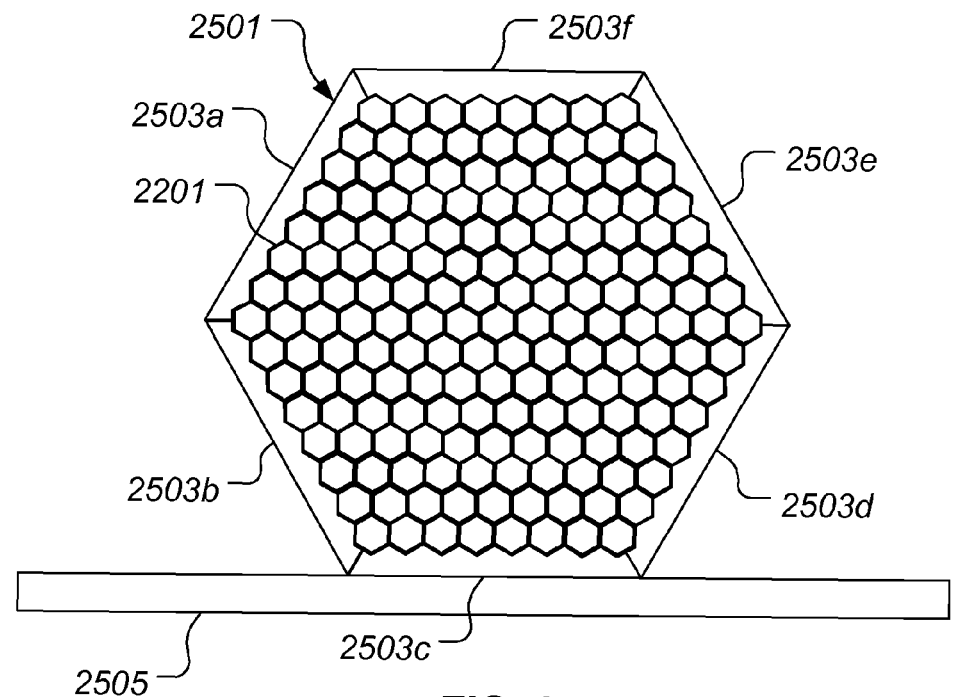
FIG. 25 is a front view of a fixture for supporting a bulk composite core, according to one example embodiment.
Figure 26:
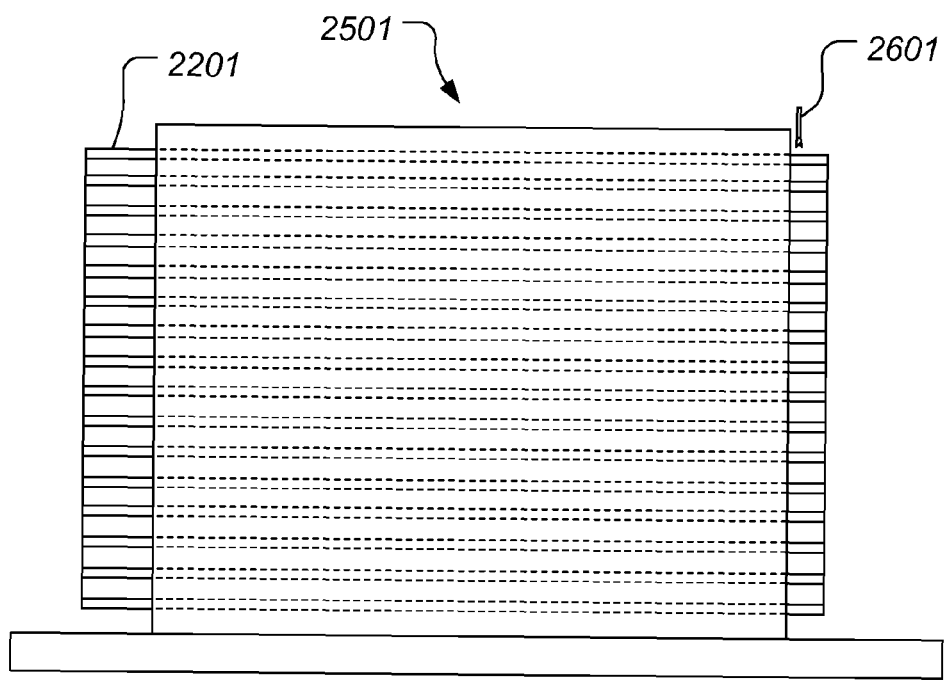
FIG. 26 is a side view of a fixture for supporting a bulk composite core, according to one example embodiment.

Referring now also to FIGS. 25 and 26, a fixture 2501 configured for supporting a bulk composite core 2201 during a cutting operation, is illustrated. Fixture 2501 includes partial sections 2503*a*-2503*f* that collectively form an outer support for bulk composite core 2201. Each partial section 2503*a*-2503*f* is a rigid member that can be coupled together to form interior surfaces that are adjacent to the exterior surfaces of bulk composite core 2201. In the illustrated embodiment, the exterior surfaces of bulk composite core 2201 are outer flat surfaces of the outer hexagonal shaped tube members 2203. Thus, the interior surfaces of partial sections 2503*a*-2503*f* mirror the outer flat surfaces of the outer hexagonal shaped tube members 2203. Fixture 2501 can be mounted to a support 2505 for stabilization.

During operation, bulk composite core 2201 can be positioned within fixture 2501 so as to partially expose a desired amount so that a cutter 2601 can cut a wafer 2401 to a desired length L2. In the illustrated embodiment, cutter 2601 is a band saw blade; however, cutter can be any device capable of cutting bulk composite core 2201. As cutter applies cutting relates forces upon bulk composite core 2201 adjacent to an exposed portion of fixture 2501, fixture 2501 keeps composite core 2201 from compressing as well as torsional twisting.

Figure 27:
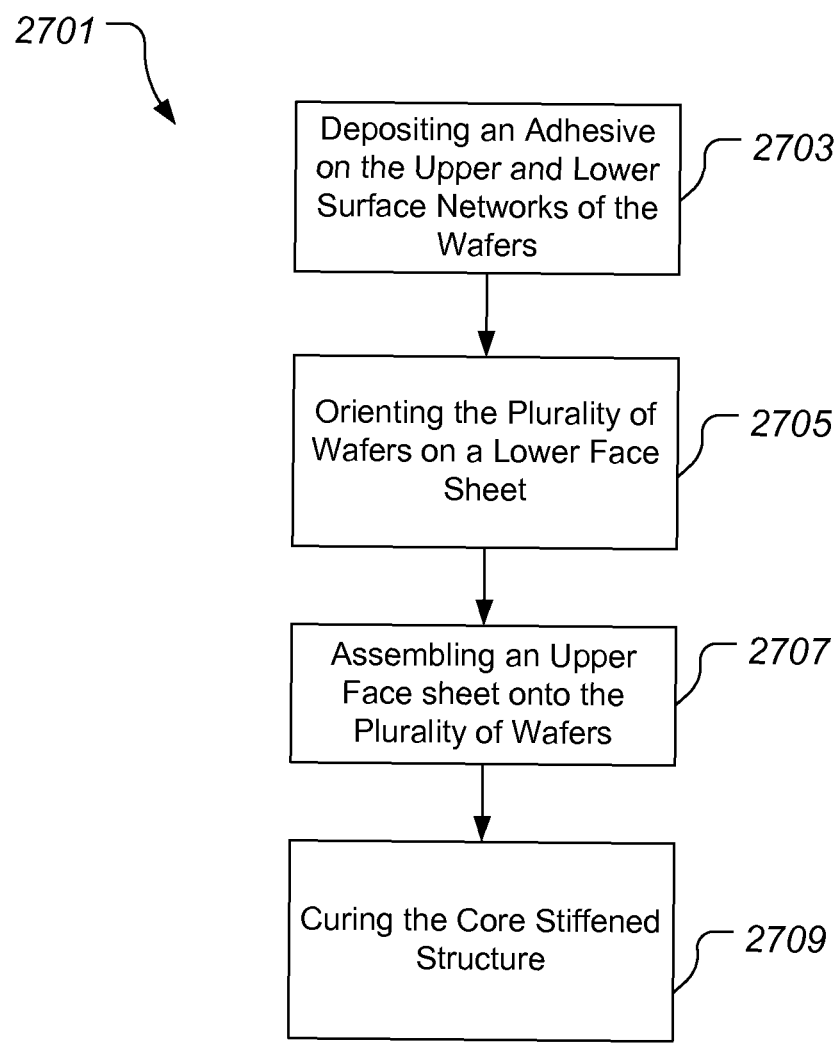
FIG. 27 is schematic view of a method for manufacturing a core stiffened structure, according to one example embodiment.

Referring now to FIG. 27, a method 2701 of configuring a plurality of wafers, such as a plurality of wafers 2401, in core stiffened structure is schematically illustrated. Method 2701 can include a step 2703 of depositing an adhesive on the upper and lower surface networks of the wafers. Method 2701 can include a step 2705 of orienting the plurality of wafers on a lower face sheet. Method 2701 can include a step 2707 of assembling an upper face onto the plurality of wafers. Method 2701 can further include a step 2709 of curing the core stiffened structure.

Figure 28:
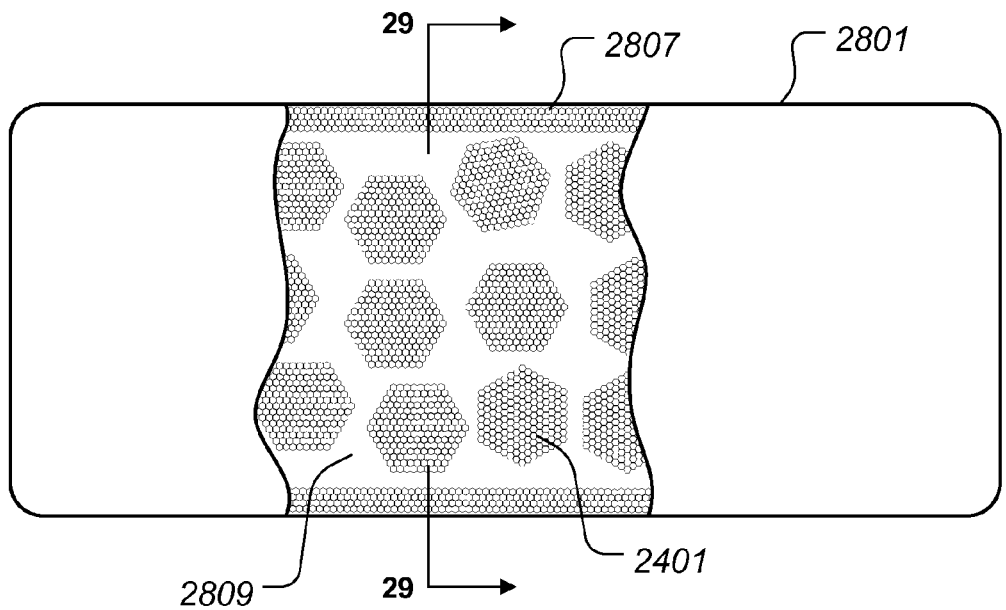
FIG. 28 is a top view of a core stiffened structure, according to one example embodiment.
Figure 29:
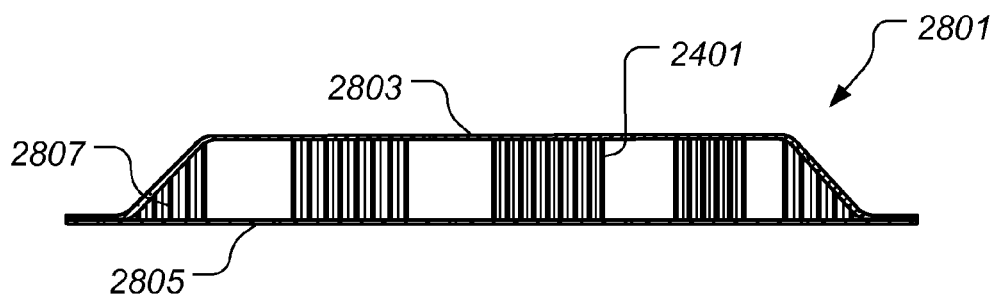
FIG. 29 is a cross-sectional view of the core stiffened structure, taken at section lines 29-29 in FIG. 28, according to one example embodiment.

Referring now also to FIGS. 28 and 29, a panel 2801 is illustrated. In the example embodiment, panel 2801 is floor panel of an aircraft, such as rotorcraft 101 of FIG. 1. Floor panel 2801 includes an upper face sheet 2803, a lower face sheet 2805, and a plurality of composite core wafers 2401 bonded therebetween. A tapered member 2807 of core can be utilized to support the tapered edge portion during the cure cycle.

Step 2703 includes depositing adhesive onto each surface network of each wafer 2401. In the preferred embodiment, a film adhesive is reticulated onto each surface network of each wafer 2401. In an alternative embodiment, a solid film adhesive can be applied, without reticulation, to each surface network of each wafer 2401. In another alternative embodiment, a paste adhesive can be applied to each surface network of each wafer 2401.

Step 2705 includes orienting a plurality of wafers 2401 onto lower face sheet 2805. Step 2705 is integral to efficiently creating panel 2801. In the preferred embodiment, step 2705 is performed by semi-randomly positioning wafers 2401. The semi-randomly positioned wafers 2401 form random sized voids 2809 in the spacing between adjacent wafers 2401. Conventional core-stiffened panels utilize continuous core between the upper skin and lower skin. In contrast, panel 2801 has non-continuous core in that wafers 2401 of core are positioned and spaced to produce voids 2809. In one embodiment, the spacing of wafers 2401 is tailored such that a certain density range is achieved. For example, a given panel 2801 may require a certain number of wafers 2401 to achieve the density range, but the only positioning requirement being that the wafers 2401 be semi-equally spaced. In another embodiment, the density of the number of wafers 2401 are purposefully not equal, such that one portion of panel 2801 has a higher number density of wafers 2401 than another portion of panel 2801.

Figure 30:
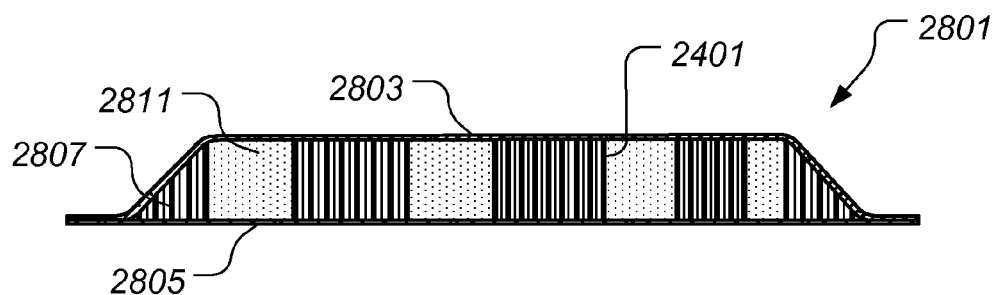
FIG. 30 is a cross-sectional view of an alternative embodiment of a core stiffened structure, according to one example embodiment.

Referring briefly to FIG. 30, in an alternative embodiment, expanding foam 2811 is utilized to fill voids 2809 such that expanding foam 2811 fills all the void space between adjacent wafers 2401. Expanding foam 2811 can act to provide a bond between adjacent wafers 2401, as well as support upper and lower face sheets 2803 and 2805 during a subsequent cure cycle. After foam 2811 is expanded, the upper surface profile can be trimmed to remove foam expanded above the desired surface profile.

Referring again to FIGS. 27-29, step 2707 can include placing upper face sheet 2803 onto wafers 2401. Step 2709 can include curing the assembly to not only cure the uncured adhesive but also any uncured members, such as upper and lower face sheets 2803 and 2805. However, in one embodiment, one or both of upper and lower face sheets 2803 and 2805 can be at least partially pre-cured prior to assembly.

It should be appreciated that even though panel 2801 is illustrated as a floor panel on an aircraft; the scope of the disclosure is not so limited; rather method 2701 can be utilized to manufacture any implementation specific core-stiffened panel. Further, panel 2801 can have non-aerospace related embodiments.

The method 2701 of manufacturing panel 2801 has advantages over the conventional methods and panels. One advantage includes the reduction of costs associated with bonding adjacent cell walls of a plurality of wafers 2401 together to form a continuous core. Further, the advantage associated with cost savings of bonding adjacent wafers 2401 together is more substantial when the wafers 2401 have a complex outer geometry, such as the illustrated hexagonal shaped wafers 2401.

Figure 31:
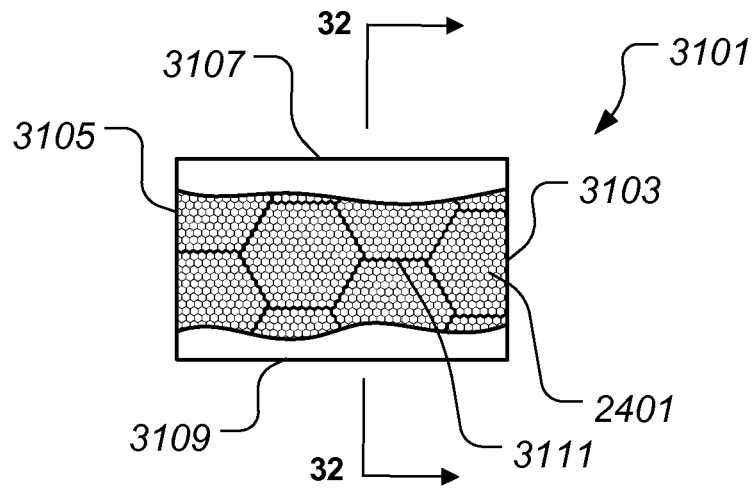
FIG. 31 is top view of a composite structure, according to one example embodiment.
Figure 32:
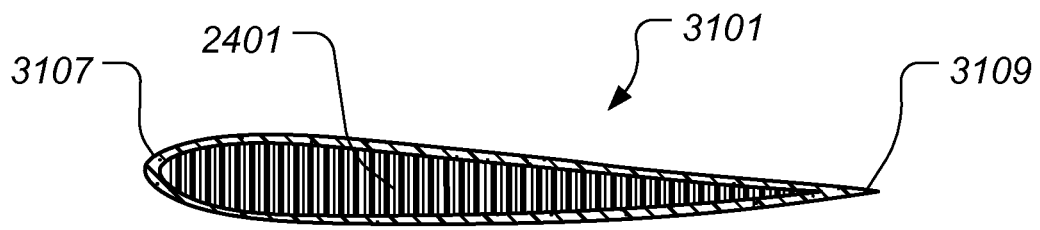
FIG. 32 is a cross-sectional view of the composite structure, taken at section lines 32-32 in FIG. 31, according to one example embodiment.

Referring now to FIGS. 31 and 32, a composite structure 3101, according to another embodiment of the present disclosure is illustrated. In the illustrated embodiment, composite structure 3101 is a horizontal stabilizer for rotorcraft 101. In another embodiment, composite structure 3101 is a wing member for aircraft. It should be appreciated that composite structure 3101 can be any composite structure in which it is desirable to tailor the strength and stiffness of the composite structure. More particularly, composite structure 3101 embodies the tailoring of the strength of the composite structure by tailoring the location, size, and/or density of the wafers 2401.

In the example embodiment, composite structure 3101 is a horizontal stabilizer having a root end 3103, a tip end 3105, a leading edge 3107, and a trailing edge 3109. The outer cell walls of each wafer 2401 are bonded to adjacent cell walls of adjacent wafers 2401 with a layer of an adhesive 3111. In the illustrated embodiment, wafers 2401 located near root end 3103 have a higher strength and stiffness than wafers 2401 near tip end 3105. Operational loading produces higher reactions near the root end 3103 compared to tip end 3105; therefore, the customization of wafers 2401 provides the unique ability to efficiently tailor strength and stiffness of a composite structure by varying the wafers 2401 accordingly. For example, a wafer 2401 near root end 3103 can have cells made from a mandrels wrapped with multiple plies of composite material, whereas wafer 2401 near tip end 3105 can have cells made from a mandrels wrapped with only a single ply of composite material. In another embodiment, the number of plies of composite material doesn't change; rather the composite material itself is different. It should be appreciated that even though composite structure 3101 is illustrated as a horizontal stabilizer, composite structure 3101 can be any implementation specific core stiffened structure.

Figure 33:
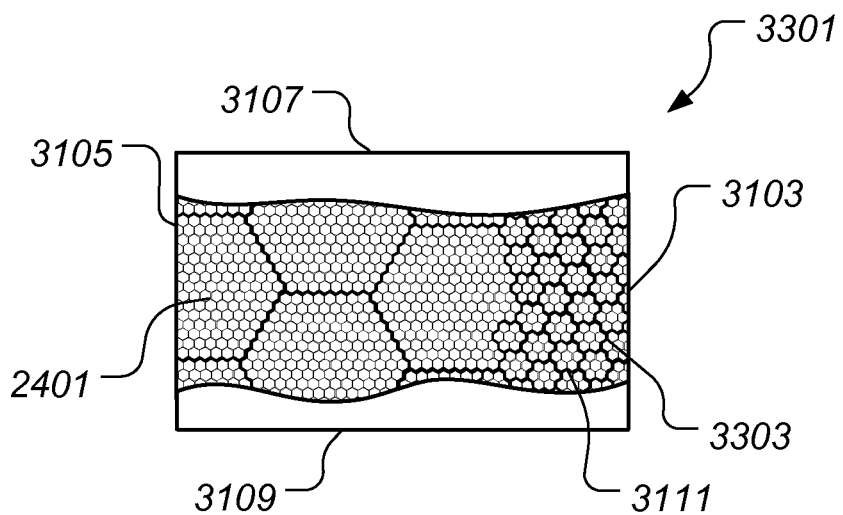
FIG. 33 is top view of a composite structure, according to one example embodiment.

Referring now also to FIG. 33, a composite structure 3301 is an alternative embodiment of composite structure 3101. In composite structure 3301, mini-sized wafers 3303 are utilized in addition to wafers 2401. Mini-sized wafers 3303 are illustrated as having seven cell members; however, the exact size and number of cells is implementation specific. In one embodiment, utilizing wafers 3303 near root end 3103 provides increased strength near root end 3103 by the increased volume in adhesive 3111, which adds density. In another embodiment, wafers 2401 have thicker cell walls, which provide the increased strength.

The composite structures 3101 and 3303 have unique advantages over the conventional core stiffened structure. One advantage includes the ability to tailor the size, placement, and orientation of the wafers to provide core derived strength in desired portions of the core stiffened structure. Because many aircraft structures have variable operationally induced loading, aircraft structures are particularly desirable for utilizing core stiffened structures with tailored core wafers.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of manufacturing a core stiffened structure, the core stiffened structure having a first face sheet, a second face sheet, and a plurality of wafers of composite core, the method comprising:
   orienting the plurality of wafers in a non-uniform pattern onto the first face sheet, the non-uniform pattern producing non-uniform spacing between adjacent wafers, each wafer having a plurality of hexagonal cell members, each hexagonal cell member having a cell wall that terminates at a first surface network and a second surface network, the plurality of hexagonal cell members assembled together such that a perimetrical shape of the wafer is hexagonal with the plurality of hexagonal cell members being oriented with adjacent cell walls in a pattern that results in the perimetrical shape of the wafer being hexagonal in that outerwardly exposed cell walls of the plurality of cell members create the perimetrical shape;
   assembling a second face sheet onto the plurality of wafers; and
   curing an adhesive to create a bond between the plurality of wafers, the first face sheet, and the second face sheet.

2. The method according to claim 1, further comprising:
   reticulating the adhesive onto the first or second surface network of the plurality of wafers.

3. The method according to claim 1, further comprising:
   filling voids between the non-uniform spaced wafers with an adhesive foam.

4. The method according to claim 1, further comprising:
   placing a tapered core member at an edge portion of the first face sheet.

5. The method according to claim 1, wherein the step of curing the adhesive also includes curing the first face sheet and the second face sheet.

\* \* \* \* \*